Figure 1:
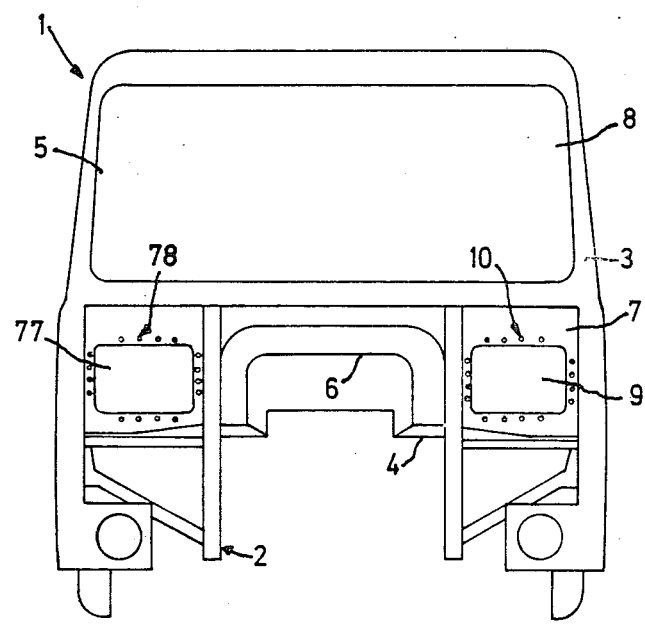

United States Patent [19]

Sjöqvist et al.

[11] 4,353,430

[45] Oct. 12, 1982

[54] ARRANGEMENT FOR FITTING A PEDAL ARRANGEMENT IN A VEHICLE

[75] Inventors: Carl D. I. Sjöqvist, Järna; Tage E. Söderberg, Stockholm, both of Sweden

[73] Assignee: Saab-Scania Aktiebolag, Sodertalje, Sweden

[21] Appl. No.: 111,294

[22] Filed: Jan. 11, 1980

[30] Foreign Application Priority Data

Jan. 16, 1979 [SE] Sweden .............................. 7900373

[51] Int. Cl.³ ...................... B62D 25/20; B60K 37/04
[52] U.S. Cl. ....................................... 180/90; 74/512; 137/354; 180/326
[58] Field of Search ................ 280/779, 780; 105/456; 180/90.6, 77 C, 321, 322, 323, 77 R, 77 S, 226, 315; 296/192; 74/512–514

[56] References Cited

U.S. PATENT DOCUMENTS

1,679,498  8/1928  Richardson ........................ 180/90.6
4,155,309  5/1979  Ames .................................. 105/456

FOREIGN PATENT DOCUMENTS

289265   2/1915  Fed. Rep. of Germany ...... 180/321
2431321  1/1976  Fed. Rep. of Germany ...... 180/315
885702  12/1961  United Kingdom .
980561   1/1965  United Kingdom .
1330268  9/1973  United Kingdom .
1330813  9/1973  United Kingdom .

*Primary Examiner*—David M. Mitchell
*Attorney, Agent, or Firm*—Cushman, Darby & Cushman

[57] ABSTRACT

In an arrangement for fitting a pedal assembly to a vehicle, at least one pedal is movably mounted on a bracket attached to a foot control panel which is connectable as a unit to the lower forward portion of a compartment space in the vehicle so that a base plate of the foot control panel covers either of two openings in the cowl panel on each side of the longitudinal center line of the vehicle. The same vehicle body can then be used for left-hand as well as right-hand drive vehicles, and mounting and service of the pedal assembly is easier.

3 Claims, 4 Drawing Figures

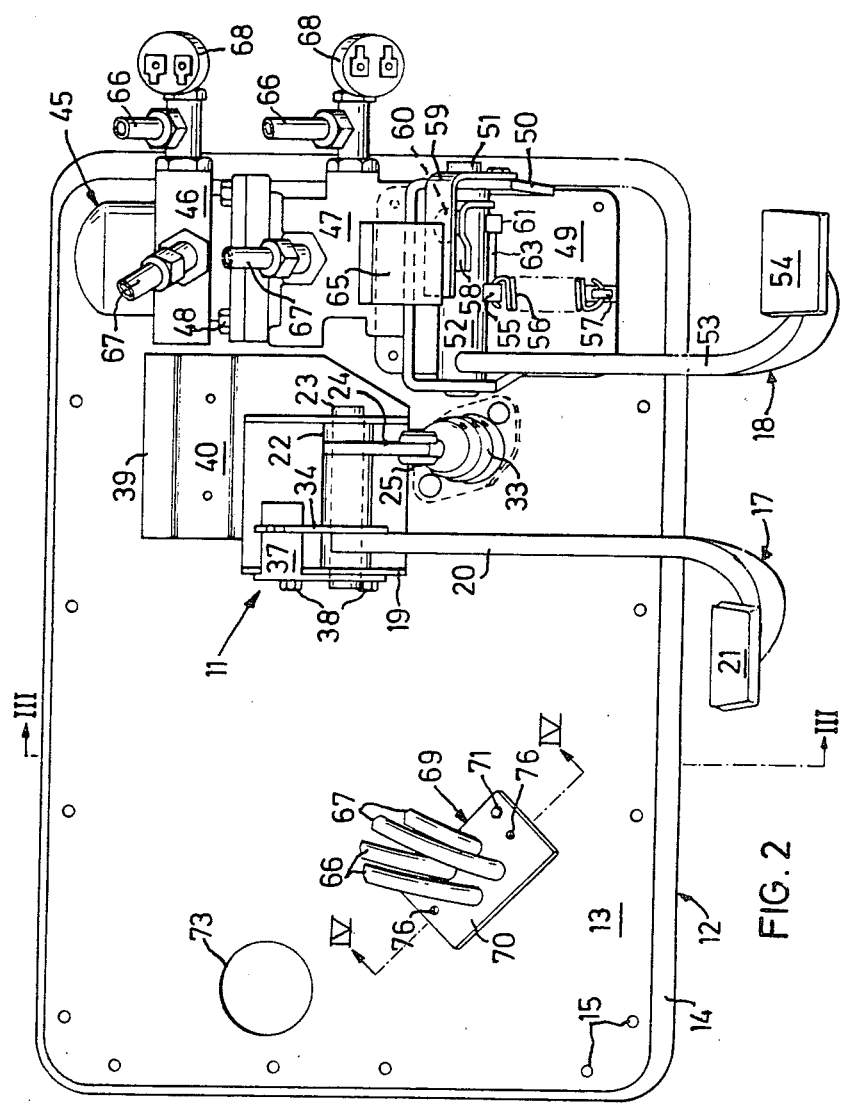

ARRANGEMENT FOR FITTING A PEDAL ARRANGEMENT IN A VEHICLE

The present invention relates to an arrangement for fitting a pedal assembly in a vehicle, said pedal assembly comprising at least one pedal movably mounted on a bracket or the like attached to a foot control panel. In vehicles, operating means for transmission clutches and wheel brakes generally are foot pedals. Such pedals are usually pivotably mounted in brackets, which in turn are fixed to the vehicle chassis, e.g. in the cowl panel and/or in the cabin floor. On actuation of the pedals, the pivoting movements are transmitted via link mechanisms to the respective active means. The link transmission can take place either purely mechanically and/or under the action of servo means, e.g. with the help of hydraulic or pneumatic pressure medium cylinders, the pivotal movements of the pedals directly or indirectly actuating valves controlling the servo means in the last-mentioned cases.

In heavy vehicles, e.g. lorries and buses, pneumatic braking systems are often used, the brake pedal usually being constructed together with a valve housing containing valves for regulating the compressed air supply to the brakes. In these cases the brake pedal and valve housing are mounted as a unit in the vehicle, compressed air pipes and other necessary components being connected to the valve housing afterwards.

The same method of approach is applied in fitting actuating and transferring means for the vehicle transmission clutch. This involves circuitous and time-consuming fitting work since fitting accessibility is limited, while the working attitudes are tiring. In service work on completed vehicles, the fitting conditions are even more difficult since the instrument panel of the vehicle further limits accessibility.

An object of the present invention is to eliminate said disadvantages.

According to the present invention there is provided an arrangement of the kind referred to wherein the foot control panel is formed with a base plate adapted for connection to either of two openings in a cowl panel in the forward position of the cabin compartment space in the vehicle, said openings being located on either side of the longitudinal centre line of the vehicle. This enables the same body to be used for both left-hand and right-hand drive vehicles. The inventive arrangement also enables all foot pedals and means connected thereto to be preassembled on the foot control panel before fitting into the vehicle, and many connections and necessary adjustments to be carried out as bench work.

Other distinguishing features of the invention will be seen from the accompanying claims.

Figure 4:
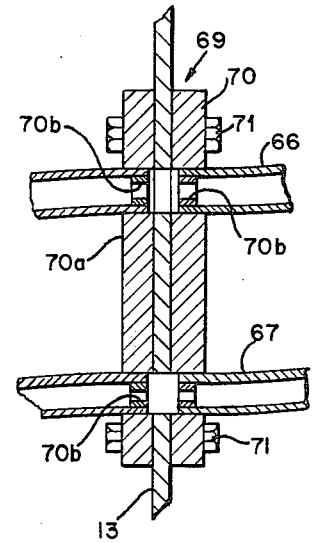
Figure 3:
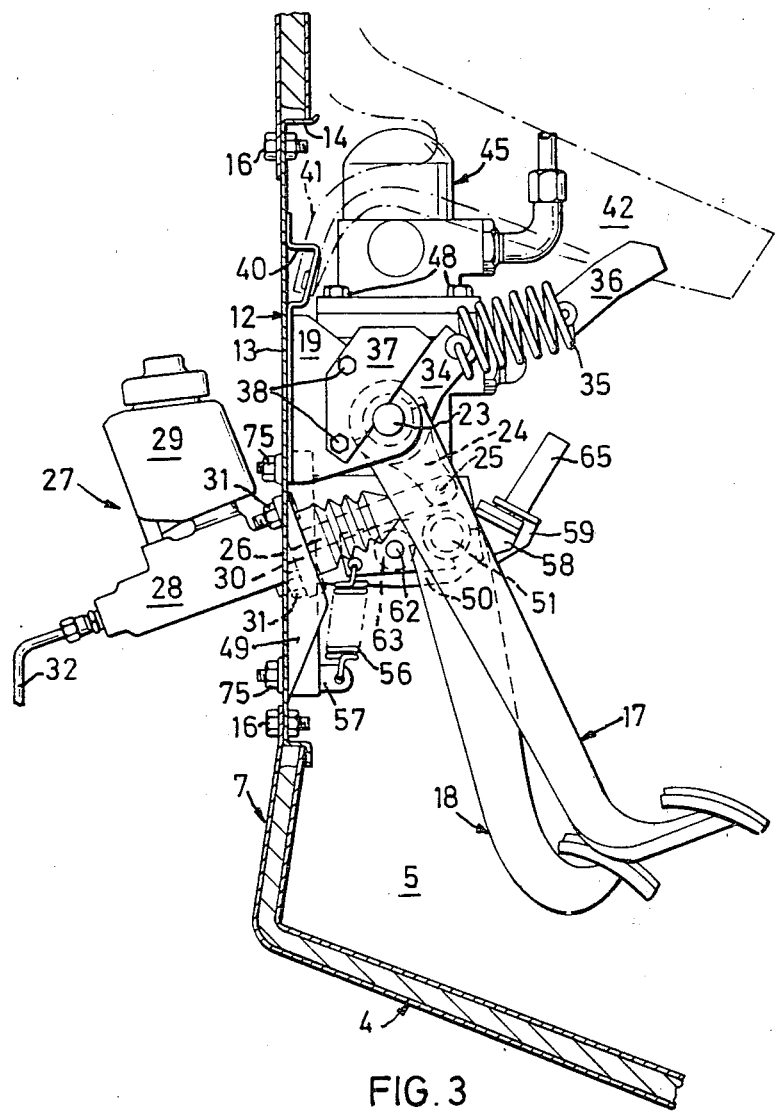

An embodiment exemplifying the invention will be described in detail below while referring to the appended drawings, on which FIG. 1 is a front view of a vehicle cabin, FIG. 2 is a front view of an inventive foot control panel seen as a loose unit, and FIG. 3 is a cross section along the line III—III in FIG. 2 of the foot control panel fitted into the driving cabin of the vehicle, FIG. 4 is a cross-section along line IV—IV in FIG. 2.

A vehicle driving cabin 1 shown in FIG. 1 is conventionally made up from a number of beams 2 and a number of body panels 3 to form a structural unit. The cabin 1 is intended for mounting on a conventional frame (not shown), constituting a portion of the vehicle chassis, the cabin being places on top of an engine (not shown) located in the chassis. The cabin 1 is provided with a vehicle floor 4 separating a compartment space 5 from the vehicle chassis. The central portion of the floor 4 is raised and constitutes an engine hood 6. In its forward portion, the floor 4 connects to a substantially vertical cowl panel 7 forwardly defining the compartment space 5. A windscreen 8 is conventionally mounted above the cowl panel 7. On the driver's side of the cabin 1, in the present example this being the left-hand side seen in the vehicle travelling direction, a rectangular opening 9 is made in the cowl panel 7, around the opening there being a plurality of small holes 10 bored to a given pattern in the cowl panel.

An inventive foot control panel 12 is illustrated in FIG. 2, the panel being intended to cover the opening 9 and to be attached to the cowl panel 7 by a number of bolted joints 16. The foot control panel 12 substantially comprises a rectangular base plate 13 carrying the vehicle pedal assembly 11. The base plate 13 is provided with a stiffening bent flange 14 along its periphery, inside the flange there being a plurality of small holes 15 bored in the base plate 13 to a pattern agreeing with that of the hole pattern about the rectangular opening 9 in the cowl panel 7. The foot control panel 12 is attached to the cowl panel 7 by means of the previously mentioned bolted joints 16 via the holes 15 in the base plate 13 and the holes 10 in the cowl panel 7.

The pedal assembly 11 comprises a clutch pedal 17 for operating a clutch incorporated in the vehicle transmission system and a brake pedal 18 for operating the vehicle brakes (not shown). The clutch pedal 17 is pivotably mounted in a bracket 19, in its turn rigidly connected to the base plate 13 by means of a spot-welded joint. The clutch pedal 17 comprises a pedal arm 20 to one end of which is welded a transverse tubular sleeve 22 and to the other end of which is welded a pedal plate 21. The tubular sleeve 22 is pivotably mounted on a bearing shaft 23 carried in two arms on the bracket 19. A lever 24 parallel to the pedal arm 20 is also welded to the tubular sleeve 22. Via a pin 25, said lever is articulatedly connected to the other end of a valve rod 26 in a clutch cylinder 27, comprising a pump and valve housing 28 and a hydraulic fluid container 29 rigidly connected to each other. The pump and valve housing 28 is provided with a flange 30 for engaging the housing 28 against a supporting surface on the base plate 13 and for attaching it thereto by means of a number of bolted joints 31. A portion of the valve rod 26 outside the pump and valve housing 28 is provided with a rubber sleeve 33 protecting it against dirt and dust. The housing 28 is connected to means actuating the vehicle clutch (not shown) via a hydraulic fluid pipe 32.

A transverse spring arm 34 is also welded to the tubular sleeve 22, one end of a helical spring 35, which is only illustrated in FIG. 3, being attached to the outer end of said spring arm. The spring 35 acts as a compression spring and is compressed between the spring arm 34 and a fixed spring seating 36. The spring 35 is disposed and dimensioned to influence the pivotal movements of the clutch pedal 17 on either side of a neutral line. In one direction the spring 35 urges the spring arm 34 against a fixed stop 37, in which position the clutch pedal 17 assumes an upper end position in accordance with what is illustrated in FIG. 3. The stop 37 is attached to the bracket 19 by means of a bolted joint 38. The spring function signifies that when the clutch pedal 17 is depressed, the helical spring 35 first counteracts the pivotal movement and then facilitating this movement after passing the neutral position of the spring. When the clutch pedal 17 is no longer activated, it returns to its upper end position under the action of springs (not shown) acting on the clutch in a manner known per se, the return movement being counteracted by the helical spring 35 to start with, the spring 35 then facilitating said return movement after it has passed through its neutral position. Between the base plate 13 and the bracket 19 a stiffening plate 39 is secured by spot welding. The stiffening plate 39 is upwardly formed with a bent portion 40 forming a transverse beam having U-shaped cross section, to the web of which is attached the lower portion 41 of a steering column support 42, indicated in FIG. 3 by chain-dotted lines. The lower portion 41 of the steering column support is preassembled on the beam 40 before the foot control panel 12 is fitted to the vehicle. The steering column support 42 is intended to carry the vehicle steering wheel column (not shown), and the previously mentioned spring seating 36 is welded to the column support 42.

As will be seen from below, the brake pedal 18 of the vehicle is pivotably mounted relative to the base plate 13. In this connection the brake pedal 18 is adapted for coaction with a brake cylinder 45, controlling and regulating the quantity of compressed air to and from the braking means (not shown) of the vehicle. The brake cylinder 45 comprises an upper valve housing 46 and a lower valve housing 47, mutually connected by a number of bolted joints 48. The brake cylinder 45 is attached to a bucket 50 provided with a flange 49 engaging against the base plate 13 and attached thereto by means of a number of bolted joints 75. The flange 49 is integral with the bracket 50 carrying between two perpendicular upstanding arms a bearing shaft 51 for pivotably mounting the brake pedal 18. The latter comprises a pedal arm 53 to one end of which is welded a transverse tubular sleeve 52 and to the other end of which is welded a pedal plate 54. The tubular sleeve 52 is journalled on the shaft 51 between the arms of the bracket 50.

A spring arm 55, parallel to the pedal arm 53, is also welded onto the tubular sleeve 52. One end of a tension spring 56 is attached to the free end of the arm 55, the other end of the spring being attached to a lug 57 integral with the brake cylinder flange 49. The spring 56 urges the brake pedal 18 to an upper inactive position, which is determined by an angularly bent arm 58 welded to the tubular sleeve 52 being pressed against a stop arm 59 bolted to the flange 49. A rubber cushion 60, cemented to the bent arm 58, is arranged between the bent arm 58 and the stop arm 59.

A lever 61 is also welded to the tubular sleeve 52, said lever being parallel to the previously described spring arm 55. A bearing shaft 62, parallel to the shaft 51, is mounted between the lever 61 and the spring arm 55. A tubular cylinder 63 is rotatably mounted on said bearing shaft 62. A valve rod (not shown) engages against the tubular cylinder 63, said valve rod being connected to valves in the two valve housings 46,47.

By means of a conventional snap-on connection (not shown), a brake light contact 65 is attached to the stop arm 59. When the pedal 18 is in its upper position, a spring-loaded contact pin is actuated by the bent arm 58 so that the brake light contact 65 assumes an open position. When the pedal 18 is depressed, said connection is broken between the bent arm 58 and the contact pin, the brake light contact 65 then assuming a closed position to activate the vehicle brake light.

As is previously mentioned, the brake cylinder 45 comprises an upper and a lower valve housing 46 and 47, respectively. The upper valve housing 46 lincludes a valve regulating the compressed air supply to the vehicle front brakes, while the lower valve housing 47 includes a valve regulating the compressed air supply to the rear brakes of the vehicle. A feed pipe 66 from an air compressor (not shown) is connected to each valve housing 46,47, and via an outlet pipe 67 from each valve housing 46,47 compressed air is taken to the braking means at the respective wheel. A pressure gauge 68 is connected to each of the two supply pipes 66 to sense the air pressure in the pipe in question, said gauges 68 being conventionally connected to indicating means on the vehicle instrument panel.

All the connection pipes 66,67 to the foot control panel 12 and the respective valve housings 46,47 are taken to a common connection block 69. This block comprises two flat halves, one inner block half 70 and one outer block half 70a. Each block half is provided with a plurality of through-holes in which the ends of the pipes 66,67 are inserted, one in each hole. An end insert 70b is pressed into each such end, said insert being expanded by a special tool so that the end of each pipe 66, 67 is firmly held between the wall of the hole and the end insert. The block half 70 thus constitutes a common flange to which the pipes 66,67 are connected. The block half 70 is rigidly fixed by means of bolted joints 71 to one side of the base plate 13, thereby covering a through-hole in the base plate 13. The other block half is adapted for connecting to the opposite side of the base plate 13. Corresponding pipe ends from the appropriate means, e.g. from air compressor and brake cylinders, are attached in an analogous manner to said block half. The block half 70 is provided with two bolt holes 76 for two clamping bolts connecting the halves to each other on either side of the base plate 13. A through-hole 73 for electric cables is also made in the base plate 13.

The inventive foot control panel 12, comprising the base plate 13 on which the pedal assembly 11 with associated components is preassembled, is intended for fixing over the opening 9 made in the cowl panel 7 of the cabin 1 by means of the bolted joints 16 through the holes 15,10 in the base plate 13 and the cowl panel 7.

The hydraulic pipe 32 from the clutch cylinder 27 to a pressure cylinder actuating the vehicle clutch is then connected. As previously described, the compressed air connections 66,67 of the brake cylinder 45 are connected to an inner block half 70 in the connection block 69, and the pipes from the vehicle air compressor and from the brake cylinders are similarly connected to the outer block half. When fitting the foot control panel 12 to the vehicle cabin 1, the connection blocks are connected to each other by means of bolted joints through the bolt holes 76, the actuating means thus being given pipe communication with the activating means.

The lower portion 41 of the steering column support 42 is preassembled on the foot control panel 12, as previously mentioned. When the foot control panel 12 is fitted to the cabin 1, an upper portion of the steering column 42 is fitted to a transverse member (not shown) on the vehicle. The two brake pressure gauges 68 and the brake light contact 65 are conventionally connected to the electrical system of the vehicle.

There is achieved, with the arrangement in accordance with the present invention, that the pedal assembly 11 and the components connected thereto can be preassembled as a unit, resulting in that such work operations can be carried out in an ergonometrically suitable working attitude and more rationally than previously. Simplification of service work is also achieved, since the foot control panel 12 can be taken down as a unit.

Apart from the direct advantages mentioned, the arrangement also enables substantial advantages in respect to production flexibility. The driver's seat in a vehicle can be arranged to the left in the vehicle, in accordance with the example described, or to the right in the vehicle. Up to now, it has been necessary to determine on which side the driver's seat is to be placed at an early manufacturing stage of the cabin. In practice, this has resulted in the necessity of manufacturing different types of cabin, depending on the position of the driver's seat.

By forming the foot control panel 12 as a fittable unit in accordance with the invention, it is possible to avoid said disadvantages. This is solved practically by making two substantially identical holes 9,77 in the cowl panel 7 of the cabin 1. Relative to the longitudinal centre line of the cabin 1, these holes are placed symmetrically to the right and to the left in the cabin, as is illustrated in FIG. 1. Mounting holes 78 are arranged round the opening 77 in the same hole pattern as the mounting holes 10 round the opening 9.

One and the same cabin 1 can thus be used for both left-hand and right-hand drive vehicles by the foot control panel 12 being fittable for connection to the appropriate opening 9 or 77. The other opening 9 or 77 in the cowl panel 7 is then used for taking through and fitting the air-conditioning system of the vehicle. Said system can comprise a duct housing accommodating heat exchanger and fan for conditioning ventilation air before taking it into the compartment. The duct housing can thereby be provided with a flange having a hole pattern in agreement with the hole pattern round the holes 9,77 in the cowl panel 7.

In certain cases it may be necessary to adjust the mounting of the components on the foot control panel with respect to the side of the cabin 1 on which the panel 12 is intended to be fitted. The fundamental construction is the same in both cases, however.

The invention is thus not limited to the exemplified foot control panel, but within the scope of the following claims it can be modified in alternative embodiments. Thus, the arrangement can be applied to vehicles with an automatic transmission, the foot control panel being formed with a pedal assembly not having a clutch pedal. The means with which the pedal assembly is arranged to coact can also be different from those set forth in the description.

Neither is the arrangement limited to the foot control panel being attached to the cowl panel of a vehicle, since the attachment can just as well be made against beams constituting a portion of the cabin framework. Advantages of stability can hereby be gained, and with the same object the base plate in the foot control panel can be provided with a plurality of stiffening beams and/or be formed with stiffening creases.

Neither is the invention limited solely to lorries, but can be just as well used for other vehicles, e.g. buses, passenger cars and working vehicles.

What we claim is:

1. A foot control panel for a vehicle comprising a base plate for connection over an opening in a cowl panel, a brake cylinder mounted on one side of the base plate, the cylinder including a valve assembly having a pressure fluid inlet and a pressure fluid outlet; at least one movable brake pedal mounted on the base plate and operatively associated with the cylinder; a pressure fluid connection block comprising two block halves mounted on opposite sides of the base plate; first and second conduits connecting the inlet and the outlet of the brake cylinder with the block half which is mounted on the same side of the base plate as the brake cylinder; and third and fourth conduits connected to the other block half, said third conduit being adapted for connection to the vehicle wheel brakes and said fourth conduit being adapted for connection to a source of fluid pressure, said two block halves placing said fourth conduit in communication with said first conduit and placing said third conduit in communication with said second conduit.

2. A panel as in claim 1 wherein the base plate has around its periphery a number of holes for receiving fastening members for fastening the plate to a cowl panel.

3. A panel as in claim 2 wherein the base plate is rectangular.

* * * * *